July 3, 1956
V. WELGE
2,753,147
VALVE FOR EXHAUST BRAKING
Filed May 14, 1953
2 Sheets-Sheet 1
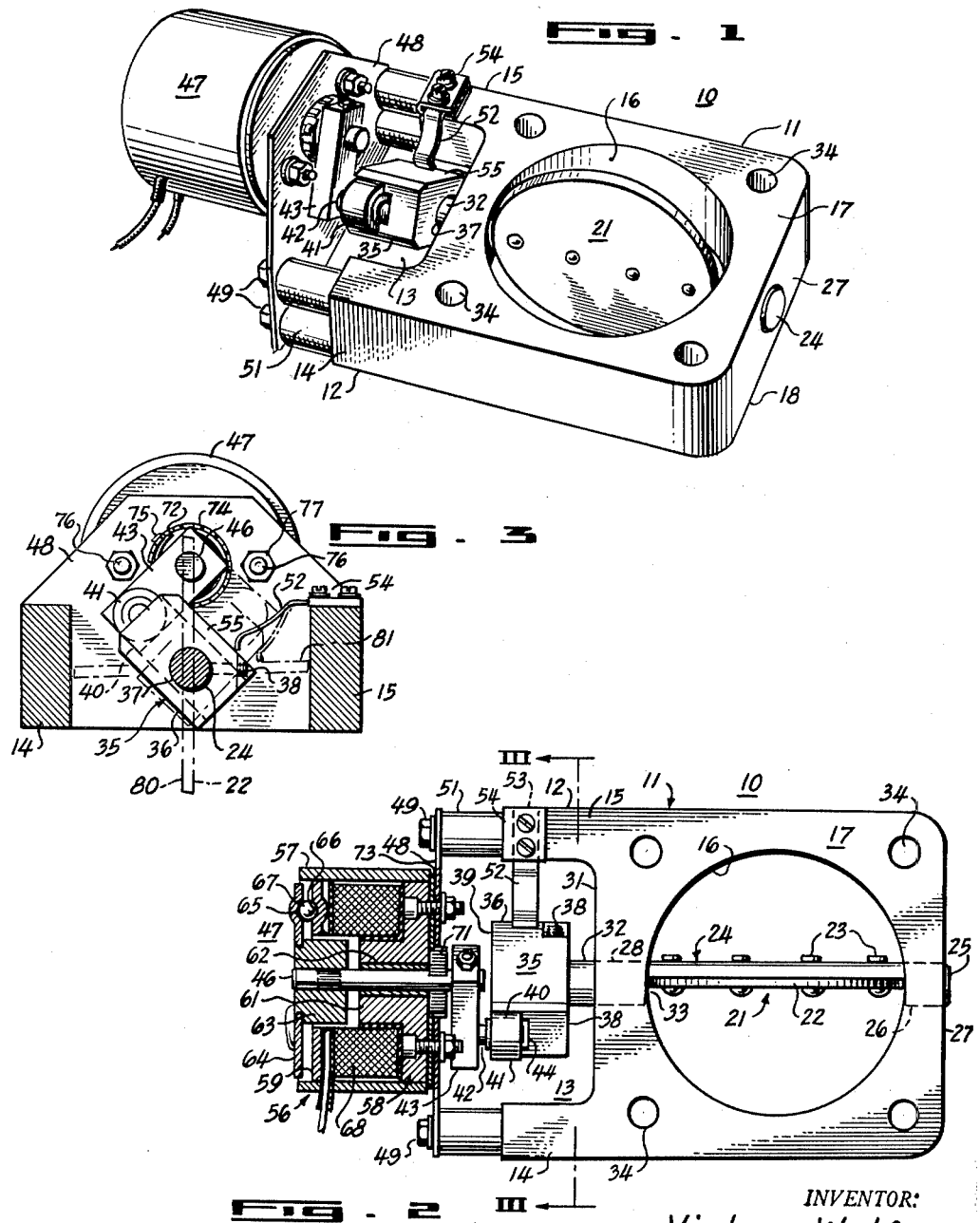
INVENTOR:
Victor Welge
BY
Walter J. Jason
ATTORNEY

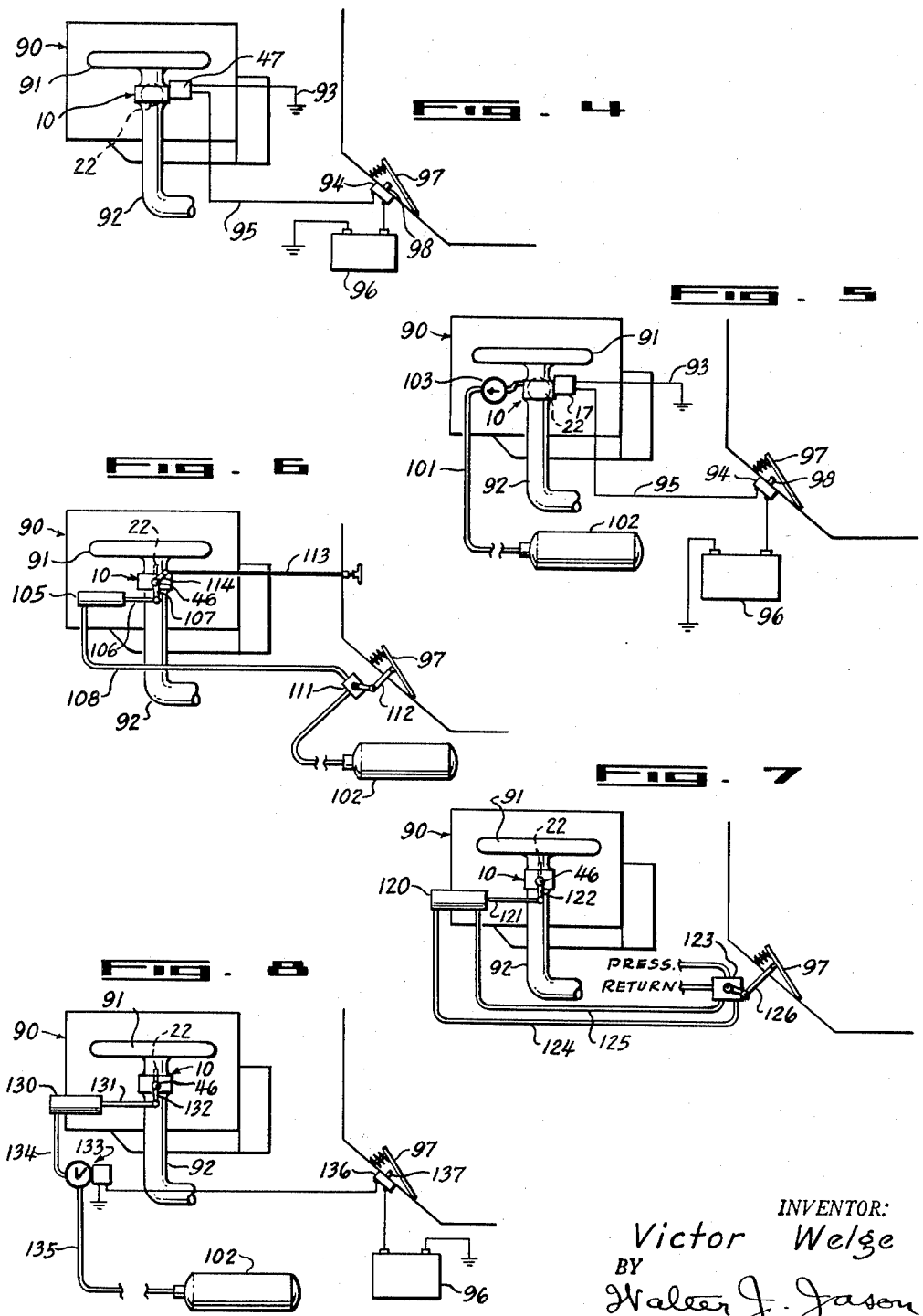

United States Patent Office 2,753,147
Patented July 3, 1956

2,753,147

VALVE FOR EXHAUST BRAKING

Victor Welge, Indianapolis, Ind.

Application May 14, 1953, Serial No. 355,040

1 Claim. (Cl. 251—233)

This invention relates to an improved device for use with internal combustion engines for controlling the speed of a motor vehicle in the descent of a steep grade.

While the present invention may be employed with the various forms of motor vehicles it finds its most useful application in connection with heavier type of vehicles such as trucks or buses. As is well known, a heavy vehicle, such as a truck, loses a great amount of time in travelling through mountainous country because of its slowing of speed during the descent of a steep grade. The operator must use a low gear in this descent to increase the engine's resistance to turning and thereby effect a sufficient restraint which will prevent the vehicle from developing an unmanageable speed. Since a low gear must be employed to achieve the desired braking compression a slowing of speed is a necessary consequence.

It is, therefore, a primary purpose of the present invention to provide an improved device for use with an internal combustion engine which will materially increase engine compression and, thereby permit the use of a higher gear during the descent of a grade which will result in increased, but safe, speed of movement down-grade.

Another object of the present invention is to provide novel mechanism for incorporation in the exhaust system of a vehicle to permit its engine to be used for braking purposes.

Another object of the present invention resides in providing an improved form of valving device for use in the exhaust system of an internal combustion engine for increasing engine compression and the braking power of the engine.

Still another object of this invention is the provision of an improved actuating mechanism for the valving device above, which actuating mechanism is readily and effectively controlled by the vehicle operator.

A further object of this invention is to provide a novel exhast restriction braking device for internal combustion engines which is simple in its parts, economical to manufacture, and efficient in its operation.

Other objects and features of the present invention will be readily apparent to those skilled in the art from the following specification and appended drawings wherein is illustrated a preferred form of the invention, and in which:

Figure 1 is a perspective view of an embodiment of an exhaust braking device in accordance with the present invention.

Figure 2 is a plan view of the braking device of Figure 1 with a portion shown in section.

Figure 3 is a view along line III—III of Figure 2.

Figure 4 is a diagrammatic illustration of an exhaust braking system employing the braking device of Figure 1.

Figure 5 is a diagrammatic illustration similar to Figure 5 but with a safety auxiliary arrangement incorporated.

Figures 6, 7 and 8 are diagrammatic illustrations of other forms of exhaust braking systems employing the braking device of Figure 1.

Having reference now in detail to the drawings, the exhaust braking device of the present invention is indicated therein generally by the numeral 10. As best shown in Figures 1, 2, and 3 braking device 10 comprises a generally rectangular block 11 having one end 12 cut away as at 13 to provide a pair of longitudinally extending projections 14 and 15. A circular opening 16 extends through block 11 from its upper face 17 to its lower face 18. This opening 16 is adapted to be closed by a butterfly valve 21 which is formed of an annular plate 22 suitably affixed as by rivets 23 to an actuating shaft 24 which spans opening 16 and has one end 25 journalled in an opening 26 afforded in end wall 27 of block 11. Another opening 28 in diametric opposition to opening 26 is provided in wall portion 31 and rotatably receives shaft 24. Shaft 24 projects through opening 28 to extend its end 32 into the space 13 provided between projections 14 and 15.

As is best shown in Figure 2, the portion of shaft 24 which spans circular opening 16 is cut away as at 33 and annular plate 22 is affixed to shaft 24 within this cut-away portion.

A plurality of through holes 34 are provided in block 11 for the accommodation of usual fastening bolts for affixing the braking device 10 to the exhaust manifold of the engine to be controlled.

Rotation of shaft 24 to effect movement of valve plate 22 between its open and closed positions is effected through an actuating arrangement which is indicated generally by the numeral 35. Actuating arrangement 35 comprises a block-like member 36 having an opening 37 in its face 38 into which the end 32 of shaft 24 is adapted to be fitted. A set-screw 38 is carried by member 36 for securing member 36 tightly to shaft 24. The opposite face 39 of block-like member 36 has a recess 40 extending its entire length which serves as a track-way for a roller 41 rotatably and slidably carried on a stub-shaft 42 which is fixedly mounted on a lever member 43 adjacent its lower end. The bottom surface of recess 40 is grooved as at 44 to permit axial movement of the end of stub-shaft 42 thereinto as will be hereinafter further discussed. Lever member 43 in turn is suitably rigidly affixed to a shaft 46 provided by an electrical actuator 47 which is mounted upon a supporting plate 48. Supporting plate 48 is held in place by a plurality of bolts 49 threaded into the end faces of the projections 14 and 15. Collars 51 positioned on bolts 49 hold the plate 48 spaced from the ends of projections 14 and 15 to permit accommodation of actuating arrangement 35 between the plate 48 and wall portion 31 of block 11.

A return spring 52 is associated with block-like member 36 and as shown is in the form of a leaf-spring having one end 53 fixedly secured to projection 15 by a mounting assembly 54 and having its other end bearing upon outer surface 55 of member 36 whereby the latter can be moved only against the force exerted by leaf-spring 52.

Actuator 47 may be any suitable device which would effect rotative movement of the shaft 46 which carries lever member 43. The device 47 shown in the drawings, and which it is understood is representative only of one form of actuator that may be employed, is a conventional rotary solenoid having a shaft which is both axially and rotatably movable. This actuator will herein be described in brief detail. For a complete description reference may be had to U. S. Patent No. 2,539,090 which is directed to the type of rotary solenoid herein employed.

Rotary solenoid 47 shown in the drawings embodies a housing 56 formed of a cylindrical member 57 having at its rear a wall portion 58 suitably rigidly connected therewithin and having spaced from its forward end a rigidly mounted wall formed by an annular plate 59. Rear wall portion 58 has a forwardly extending integral projection 61 which forms a core. A bearing 62 is carried by rear wall 58 and core 61 for the accommodation of shaft 46 which is adapted to move axially and rotatively therewithin. As shown the portion of shaft 46 projecting forwardly of bearing 62 has an armature 63 rigidly mounted thereon for axial and rotative movement therewith, armature 63 being so positioned on shaft 46 as to extend a portion thereof beyond annular plate 59. Suitably rigidly affixed to the forward face of armature 63 is an annular plate 64 which projects radially beyond the armature and lies in parallel spaced relation to fixed wall plate 59. Plate 64 being secured to armature 63 will, of course, rotate therewith. Formed in rotary plate 64 and fixed forward wall plate 59 are a plurality of pairs of grooves 65 and 66 with the surfaces of each pair of grooves inclined in opposite directions and having a ball 67 disposed therebetween. Positioned within cylindrical casing 57 between rear wall portion 58 and the fixed forward wall plate 59 and in encircling relation to the core 61 and a portion of the armature 63 is an energizing coil 68 which on energization effects axial movement of armature 63. On axial movement of armature 63 rotatable plate 64 is made to press on the various balls 67 disposed in the aligned pairs of oppositely inclined grooves 65 and 66 whereby rotatable plate 64 is forced to rotate simultaneously with its axial movement. This results in both rotary movement and axial movement being imparted to armature 63 and shaft 46. A return spring 71 in the form of a coil spring is suitably connected at one of its ends to shaft 46 and at its outer end 72 to an anchoring plate 73. Anchoring plate 73 has bent therefrom a plurality of outwardly extending integral lugs 74 serially arranged about a central opening provided in anchoring plate 73. The outer end 72 of spring 71 is provided with a hook portion 75 struck therefrom which is adapted to grasp a lug 74 thereby to anchor spring 71 so that it is prevented from moving when placed under tension.

A plurality of mounting bolts 76 are carried by rear wall portion 58 and project their threaded shanks through openings in supporting plate 48 of block 11. Nuts 77 cooperate with bolts 76 to connect actuator 47 upon supporting plate 48. Bolts 76 also serve to support anchoring plate 73 on actuator 47.

It is understood that any suitable electrical source and electrical controlling devices may be electrically associated with rotary solenoid 47 to effect and control the operation thereof. With rotary solenoid 47 suitably electrically connected to have current furnished thereto coil 68 may be energized. Energization of coil 68 will move armature 63 and rotatable plate 64 mounted thereon axially toward armature 63. As above related rotatable plate 64 will cause armature 63 to rotate simultaneously with its axial movement. Shaft 46 being secured to armature 63 will in turn be made to move axially and rotatively simultaneously. This movement of shaft 46 effects a bodily displacement of lever member 43 toward block 11 while at the same time rotating it. Rotative movement of lever member 43 will cause roller 41 carried by stub-shaft 42 to move in track-way 40 in block-like member 36. Stub-shaft 42, as hereinbefore described, is mounted on lever member 43. The outer end of stub-shaft 42 is adapted to be accommodated within the groove 44 in the bottom wall of track-way 40 when lever member 43 is bodily displaced in the direction of block 11. Roller 41 slidably and rotatably positioned on stub-shaft 46 will move within track-way 40 of member 36 as stub-shaft 46 pivots about shaft 46 as a center. As roller 41 rides along the wall-surfaces of block-like member 36 which define track-way 40 it will cause block-like member 36 to rotate to effect rotative movement of valve shaft 24. This rotative movement of block-like member 36 is had against the restraining force of the leaf spring 52. Rotative movement of valve shaft 24 will move valve plate 22 from its open position, indicated in Figure 3 by a dash-dot outline at 80, to its closed position also indicated by a dash-dot outline which is identified by the numeral 81.

On de-energization of the coil 68 of actuator 47 solenoid shaft 46 will be rotated to its original position by return coil spring 71. This will effect rotation of lever member 43 to its starting position. Roller 41 will ride in the reverse direction in track-way 40 to return block-like member 36 and effect reverse rotation of valve shaft 24 to its open position 80. Leaf-spring 52 in this reverse movement of parts exerts its force on block-like member 36 to assist the reverse rotative movement thereof.

Braking device 10 having been described in its parts and in the manner of operation of these parts will now be discussed in connection with an engine and with various control devices for effecting operation of braking device 10.

Reference now will be made to Figure 4 wherein is shown an arrangement for achieving the desired advantages of the present invention. The numeral 90 indicates a conventional vehicle engine having a usual exhaust manifold 91. Braking device 10 is mounted to exhaust manifold 91 between it and a usual exhaust line 92. In this mounting, it is understood that opening 16 of braking device 10 is in alignment with the outlet of exhaust manifold 91 and the inlet to exhaust line 92 and valve plate 22 will be in position to close the passage from the manifold to the exhaust line. In the arrangement of Figure 4 the actuator for effecting the desired movement of valve plate 22 between its open and closed positions within the exhaust passage is rotary solenoid 47 described hereinabove. Rotary solenoid 47 is connected to ground by a conductor 93 and connected to a control switch 94 by a conductor 95. Control switch 94 is of conventional construction and controls the making and breaking of the electrical circuit to rotary solenoid 47. Control switch 94 is connected in usual manner to a battery 96 which preferably is the battery normally carried by the vehicle. Thus current for energization of rotary solenoid 47 is afforded by the normal electrical system of the vehicle. Control switch 94 is positioned adjacent the brake pedal, indicated at 97, of the vehicle to be operated thereby when brake pedal 97 is depressed by the operator's foot. Any suitable connection may be provided between the brake pedal 97 and control switch 94. For example, the control switch 94 may have an actuating element 98 which extends beneath the brake pedal 97 in position to be engaged by the pedal, when the latter is depressed, to effect the closure of the contacts, now shown, of control switch 94. It is preferred that the actuator for control switch 94 be so located relative to brake pedal 97 that it will operate control switch 94 when brake pedal 97 has been depressed through but a small portion of its travel. On operation of control switch 94 to complete the circuit to rotary solenoid 47 the latter operates to rotate valve plate 22 of braking device 10 into its closed position. With the movement of valve plate 22 into closed position the exhaust gases of the engine cannot pass from the exhaust manifold 91 to the exhaust line 92 and the pistons of the engine are then required to work against back pressure on their exhaust strokes. This creation of a back pressure in the engine will thus increase engine drag which obviously results in a slowing down of the vehicle. Braking device 10 thus increases the effectiveness of the engine as a braking device for the vehicle. Since the engine provides substantial braking for the vehicle less use is made of the brakes with consequent increase of the life of the brakes and a minimizing of the possibility of brake failure and brake drum warpage. The use of a higher gear to obtain increased engine speed is permitted if it is desired to increase the speed of the vehicle while descending a steep grade. In the descent of a steep grade in this higher gear the operator need not fear loss of control of the vehicle because of the restraint provided by the engine when under the influence of braking device 10.

Alternatively a control switch for rotary solenoid 47 could be operatively associated with the accelerator pedal. The control switch in such case would be one whose contacts would be adapted to be held in open circuit position through any suitable connection when the accelerator pedal was in a depressed position but which would move to closed circuit position when the operator's foot was removed from the accelerator pedal. On closing of the circuit the rotary solenoid 47 would then operate to effect movement of valve plate 22 to block the passage of the exhaust gases from the exhaust manifold 91 and provide the desired back pressure in the engine.

Figure 5 illustrates an arrangement similar to that of Figure 4 except for an added safety feature. Here again the rotary solenoid 47 is employed for control of valve plate 22 of braking device 10. The rotary solenoid 47 is itself under the control of the switch 94 which is subject to operation by the brake pedal 97. The added feature of this second arrangement consists of a conduit 101 connected to a suitable opening provided in block 11 of braking device 10 through which exhaust gases may pass from exhaust manifold 91 to conduit 101 and therethrough to a conventional air tank 102 carried by the heavy vehicle for braking purposes. Air tank 102, it is understood, is conduit connected, as is conventional, to the vehicle's normal air compressor system and to its braking system, not shown. Conduit 101 affords an emergency means through which a suitable working pressure can be maintained within the air tank 102, the back pressure developed in the exhaust manifold 91, when valve plate 22 of braking device 10 is in closed position, being utilized to this purpose. With an emergency source of pressure the required performance of the vehicle's braking system is assured though the vehicle's air compressor system has failed. A usual check valve 103 is provided in conduit 101 to prevent any flow of compressed air from the air tank 102 to the exhaust manifold 91 when the air compressor system is functioning normally.

In the arrangement of Figure 6 braking device 10 is actuated by different means than used hereinbefore. Actuating assembly 35 which moves valve plate 22 between its open and closed positions is operated by shaft 46. Shaft 46, in the above described arrangements, served as the armature shaft of rotary solenoid 47. As was hereinbefore stated the present invention is not limited to only one form of actuator for effecting rotation of shaft 46. Rotary solenoid 47 is the preferred device for obtaining the desired movements but other means are contemplated, which means will now be described. These means will be operatively connected to shaft 46 which, it is understood, is rotatably positioned on supporting plate 48 and arranged to project an end outwardly of plate 48 to which a connection may be made. The arrangement of Figure 6 utilizes a conventional air cylinder and piston actuator 105 having therein a usual piston, not shown, whose stem 106 is pivotally connected to one end of a lever 107 which is secured at its opposite end to rotatable shaft 46. Cylinder and piston actuator 105 is connected by a conduit 108 to a conventional air valve 111 which controls the passage of air from the vehicle's usual air tank 102 which is carried for braking purposes. Air valve 111 is connected by an actuating linkage 112 to the brake pedal 97 and is adapted to open as the brake pedal 97 is depressed through a small fraction of its travel. Actuation of air valve 111 to its open position permits pressurized air to pass from air tank 102 to cylinder and piston actuator 105 to effect movement of stem 106 for rotation of lever 107 and shaft 46 to move the butterfly valve of braking device 10 to its closed position to block the escape of exhaust gases from manifold 91. To return the various parts to their normal position when air pressure is released any usual spring means, not shown, may be employed with air cylinder and piston actuator 105. Air valve 111 desirably is a conventional three-way valve which is adapted to exhaust to atmosphere so that leakage through the valve in its closed position will not cause pressure to build up in air cylinder and actuator 105 and inadvertently rotate lever 107 to close the butterfly valve of braking device 10.

If desired the accelerator of the vehicle could be employed for actuation of valve 111 to control the passage of air from air tank 102. In this case the valve 111 would be such as would be in its closed position when the accelerator was in depressed position and would move to open position when the operator's foot was removed to permit air to pass through the valve to operate air cylinder and actuator 105.

Means are illustrated in Figure 6 whereby the vehicle operator may manually control the operation of butterfly valve 22 of braking device 10. These means consist of an actuating rod 113 extending from within the vehicle to a connection with a lever 114 which is affixed to shaft 46. The operator by manually moving actuating rod 113 can close or open the butterfly valve plate 22 at will independently of the brake pedal or accelerator pedal. A manual control is of importance to assure continual control over braking device 10 should the air tank pressure fail for any reason.

In the arrangement of Figure 7 the actuating shaft 46 is driven hydraulically. A conventional hydraulic cylinder and piston actuator 120 is provided which has its piston stem 121 pivotally connected to a lever 122. Lever 122 is affixed to shaft 46 and when moved by stem 121 effects rotative movement of shaft 46 to motivate actuating assembly 35 and operate butterfly valve plate 22 of braking device 10 between its open and closed positions. Hydraulic fluid, which may be oil, for the operation of hydraulic cylinder and piston actuator 120 is provided under pressure from a source, not shown, through usual connections to a conventional four-way valve 123. A pair of conduits 124 and 125 permit the fluid to pass between valve 125 and actuator 120. A connecting linkage 126 is afforded between brake pedal 97 and valve 123 to permit the operator to actuate valve 123 by means of the brake pedal. Valve 123 has a construction whereby in one position it will allow fluid to flow through conduit 124 to one side of actuator 120 to move the piston stem 121 thereof to effect operation of shaft 46 to move butterfly valve plate 22 of braking device 10 to its closed position. Oil on the opposite side of the actuator 120 will discharge through line 125 to return to valve 123 and therethrough to any convenient storage container, which may be the vehicle's crank case. To return the parts to their normal position valve 123 will be manipulated to permit fluid under pressure to be passed through conduit 125 to the right-hand side of the piston actuator 120. Stem 121 will be retracted and in this movement rotates shaft 46 to effect return operation of butterfly valve plate 22 to its open position. Fluid present in the left-hand side of actuator 120 will, in this return operation, be forced from actuator 120 through conduit 124 to return to valve 123 and therethrough to the storage container.

Here, too, if desired the accelerator pedal of the vehicle, rather than the brake pedal, could be suitably connected to valve 123 so that when depressed the hydraulic cylinder and piston actuator 120 is in its normal position to hold butterfly valve plate 22 open, but when the operator's foot is removed from the accelerator pressure valve 123 is actuated to pass the fluid to actuator 120 to effect the desired operation of butterfly valve plate 22 to its closed position.

An optional means, not shown, of operating oil valve 123 would be through a solenoid valve which was under the control of a switch suitably connected for operation by the brake pedal or accelerator pedal.

Another optional arrangement would be the use of a three-way valve having a discharge to the crank case. In this instance a spring would be required in actuator 120 to effect return of piston stem 121.

Figure 8 illustrates a system wherein the actuator for shaft 46 is a conventional air cylinder and piston actuator 130. Actuator 130 has a piston stem 131 which connects to lever 132 affixed to shaft 46, axial movement of piston stem 131 effecting rotative movement of shaft 46 to move butterfly valve plate 22 between its open and closed position. Air under pressure for operating cylinder and piston actuator 130 is provided by air tank 102 which serves also to provide air for operation of the vehicle's conventional braking system, not shown. The passage of air to actuator 130 is controlled by a usual solenoid operated valve 133 interconnected with actuator 130 by a conduit 134 and with air tank 102 by a conduit 135. The operation of solenoid operated valve 133 is controlled by a switch 136 electrically connected to the vehicle's battery 96. Switch 136 has an actuator 137 which is operable by brake pedal 97 to actuate the switch 136 to make and break the electrical circuit therethrough. On depression of brake pedal 97 switch 136 actuates solenoid operated valve 133 to permit passage of air from tank 102 to air cylinder and piston actuator 130 to move piston stem 131 to effect rotation of shaft 46 and movement of butterfly valve plate 22.

Valve 133 preferably is a three-way valve which exhausts to atmosphere so that leakage through the valve will not cause pressure to develop in actuator 130 for inadvertent movement of stem 131 and butterfly valve plate 22.

Here, once again, if desired the operation of switch 136 could be under the control of the accelerator pedal, with switch 136 being of the type which is open when the accelerator pedal is depressed and closed when the operator's foot is removed.

From the foregoing, it is apparent that the braking device 10 of the present invention is adapted for ready installation in a vehicle and is an effective supplement to the vehicle's normal braking means. With the present invention the normal braking means will be used primarily to bring the vehicle to a stop.

While certain preferred embodiments of the invention have been specifically disclosed, it is understood that the invention is not limited thereto, as many variations will be readily apparent to those skilled in the art and the invention is to be given its broadest possible interpretation within the terms of the following claim.

What I claim is:

An exhaust braking device for interposition between the exhaust manifold and exhaust line of a vehicle engine comprising: a support member having an opening therein to provide passage for exhaust gases from the exhaust manifold to the exhaust line, a shaft rotatably mounted on said support member extending transversely across said opening and having a free end projecting from said support member, a valve plate mounted on said shaft in said opening for movement between an open position and a closed position to control the flow of the exhaust gases through said opening, an actuating assembly for actuating said shaft, said actuating assembly comprising a generally block-like member mounted on the free end of said shaft, said block-like member having one of its faces grooved to provide a track-way, a rotatably mounted member, means providing an operative interconnection between said block-like member and said rotatably mounted member, said means including a roller movable within said track-way to effect rotation of said block-like member, a resilient member mounted on said support member for biasing said block-like member to a normal position, and an actuator for moving said rotatably mounted member.

References Cited in the file of this patent

UNITED STATES PATENTS

| | | |
|---|---|---|
| 942,467 | Sharpneck | Dec. 7, 1909 |
| 1,483,657 | Glidden | Feb. 12, 1924 |
| 1,483,658 | Glidden | Feb. 12, 1924 |
| 1,577,466 | Hyre | Mar. 23, 1926 |
| 1,588,569 | Best | June 15, 1926 |
| 1,620,100 | Hoxton | Mar. 8, 1927 |
| 1,752,229 | Brueckel | Mar. 25, 1930 |
| 1,890,790 | Messinger | Dec. 13, 1932 |
| 1,940,712 | Ertz | Dec. 26, 1933 |
| 2,035,166 | Kimball | Mar. 24, 1936 |
| 2,168,232 | Messinger | Aug. 1, 1939 |

FOREIGN PATENTS

| | | |
|---|---|---|
| 904,318 | France | Feb. 26, 1945 |